F. H. BEAMER.
RESILIENT VEHICLE WHEEL.
APPLICATION FILED AUG. 29, 1910.
1,023,497.
Patented Apr. 16, 1912.
2 SHEETS—SHEET 1.
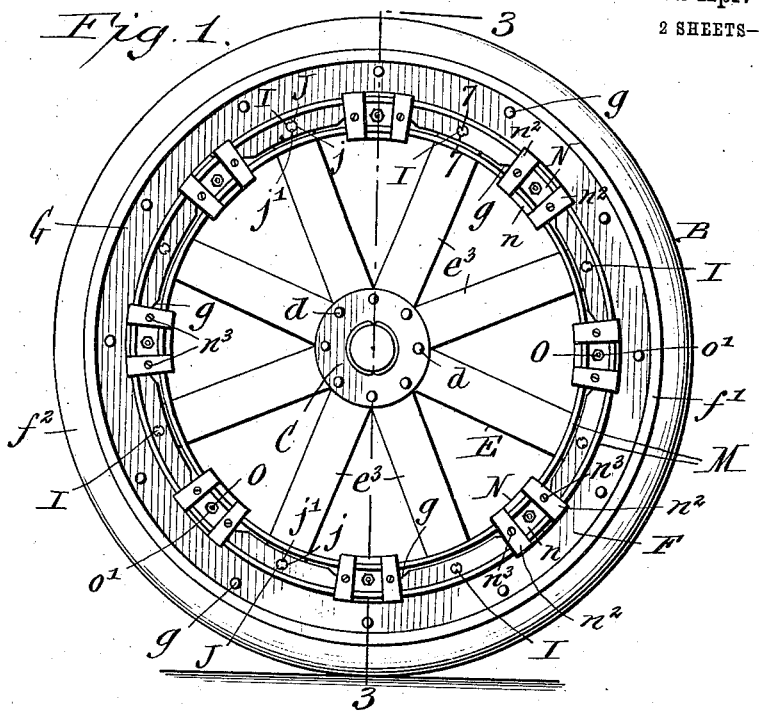
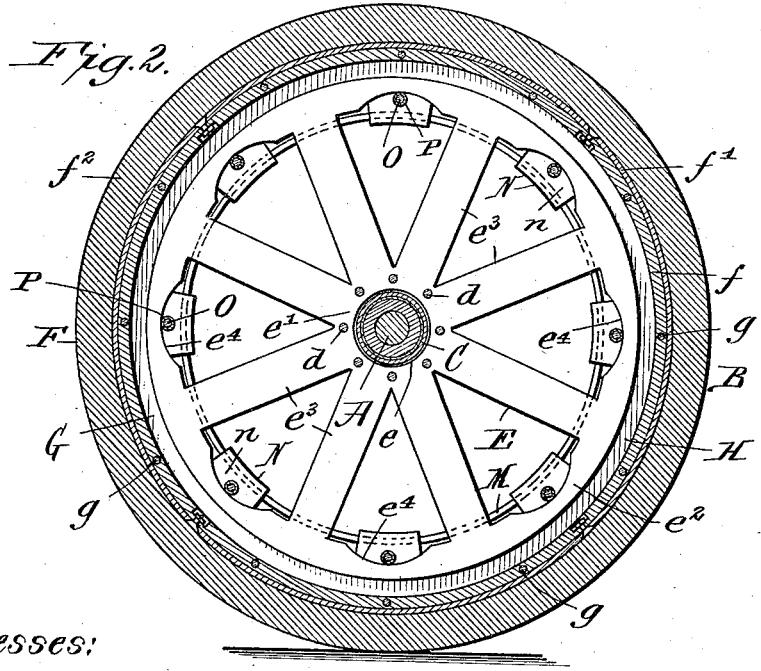

F. H. BEAMER.
RESILIENT VEHICLE WHEEL.
APPLICATION FILED AUG. 29, 1910.
1,023,497.
Patented Apr. 16, 1912.
2 SHEETS—SHEET 2.
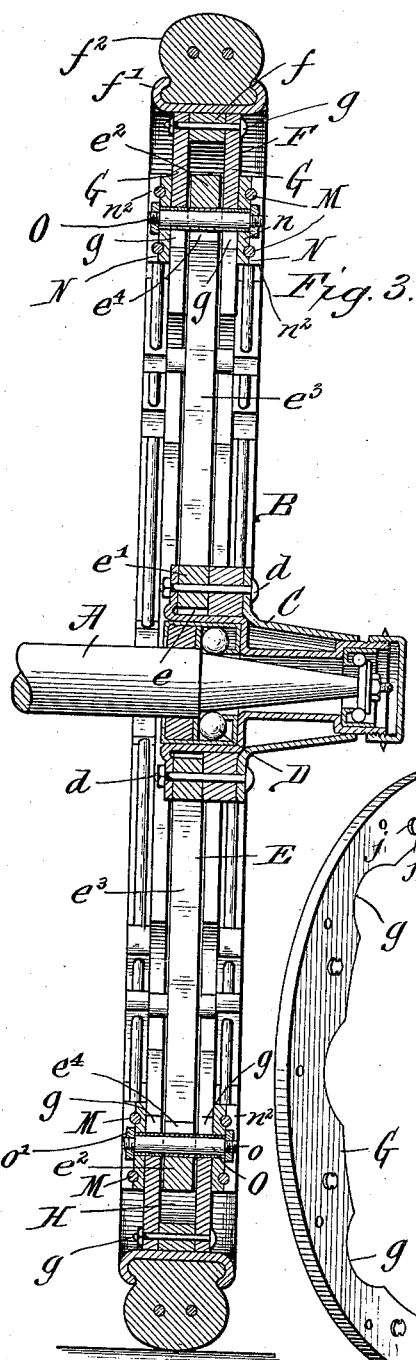
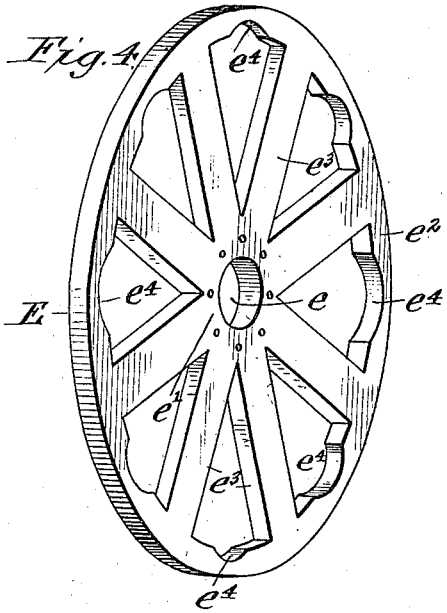
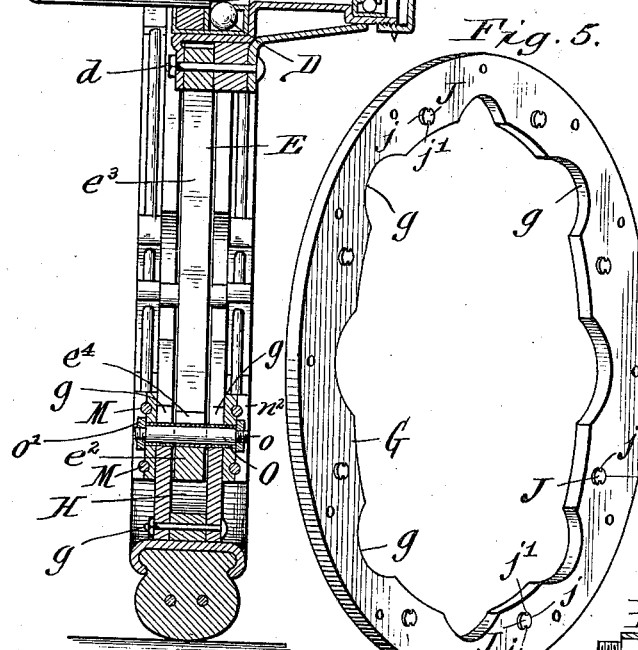
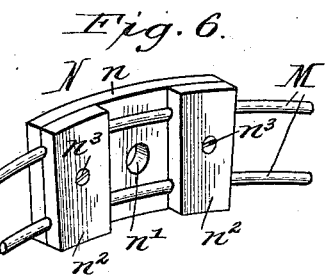
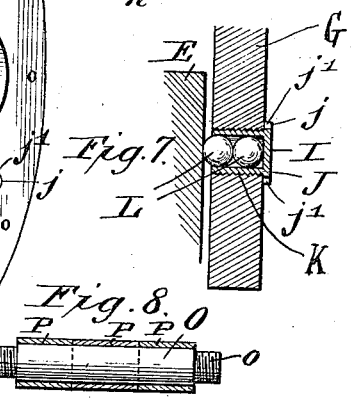
Witnesses:
Jacob Oberst, Jr.
Ella C. Pinckhahn.
Frank H. Beamer, Inventor.
By Emil Neuhart,
Attorney.

UNITED STATES PATENT OFFICE.

FRANK H. BEAMER, OF BUFFALO, NEW YORK.

RESILIENT VEHICLE-WHEEL.

1,023,497.   Specification of Letters Patent.   Patented Apr. 16, 1912.

Application filed August 29, 1910. Serial No. 579,487.

*To all whom it may concern:*

Be it known that I, FRANK H. BEAMER, a citizen of the United States, and resident of Buffalo, in the county of Erie and State of New York, have invented certain new and useful Improvements in Resilient Vehicle-Wheels, of which the following is a specification.

My invention relates to new and useful improvements in vehicle wheels especially adapted for use on automobiles and other similar vehicles.

The objects of my invention are, first, the production of a wheel having a central member providing elastic motion in starting and stopping the vehicle which results in great benefit to the engine of the vehicle and also eliminates or at least minimizes the jars and jolts while passing over rough roads; second, the provision of a wheel having a yielding contact or traction member so connected with the central member that the greater portion of the jars or shocks to which the wheel is subjected, is absorbed by the connection between the two members; third, to provide an increase of resistance between the two members of the vehicle wheel when placed under extra strain; fourth, to so construct the vehicle wheel that all chances of breaking the springs of the vehicle under extraordinary strain is eliminated and to resist such strains in a constantly springy manner under all conditions of the road; fifth, to eliminate all up-throw of the car and to so construct the wheel that the strain placed thereon tending to throw the body of the car upward is absorbed in the employ of the central member of the wheel; sixth, to provide a wheel of this character which will tend to maintain the car-body at all times at a more even distance from the road surface than would be possible with a wheel equipped with a pneumatic tire; seventh, the provision of means embodied in the construction of the wheel whereby the wheel automatically and instantaneously adjusts itself to any and all road conditions either with or without a rubber tire; eighth, the provision of a wheel where safety in fast traveling is assured and which can be easily adjusted to any size or weight of car, either new or old, and to otherwise improve on vehicle wheels of this type heretofore devised.

With these and other objects in view, the invention consists in the construction, arrangement, and combination of parts to be hereinafter described and particularly pointed out in the subjoined claims.

In the drawings,—Figure 1 is a side elevation of a vehicle wheel constructed according to my invention. Fig. 2 is a central section taken circumferentially through the wheel. Fig. 3 is an enlarged vertical section taken on line 3—3, Fig. 1. Fig. 4 is a detached perspective view of the inner wheel member. Fig. 5 is a detached perspective view of one of the annular side members constituting part of the outer wheel member. Fig. 6 is a perspective view of a portion of the annular springs and one of the spacing members. Fig. 7 is an enlarged sectional view taken on line 7—7, Fig. 1, the springs being omitted from this figure. Fig. 8 is a sectional elevation of one of the roller bearing fastening bolts.

Referring now to the drawings in detail, like letters of reference refer to like parts in the several figures.

The reference letter A designates a vehicle axle and B my improved vehicle wheel considered as a whole, which is mounted on said axle. The hub of the wheel may be of any common construction, fastened to the axle if used on the rear wheel of an automobile or car and rotatable on the axle if used on the front or stub axles. In the drawings, however, I have shown a hub which is designated by the letter C and has the usual ball bearings D. Secured to this hub in any suitable manner, but preferably by means of bolts $d$, is a circular member E in the form of a spider it having a central opening $e$ for convenience in passing the same over a part of the hub to be clamped thereon by a second part of the hub. This circular member and the hub C constitute the inner member of the wheel; and in order that the wheel resembles as near as possible the standard wheel now in use, it is made with a hub portion $e^1$, a rim $e^2$ and radial arms or spokes $e^3$, the inner periphery of the rim between the spokes having curved notches $e^4$ for a purpose to be hereinafter described.

The outer member of the wheel which is designated F comprises a felly $f$ to which is secured around its peripheral edge a tire rim $f^1$ having a rubber or other tire $f^2$ applied thereto and annular side members G which are secured to opposite sides of said felly by means of bolts $g$ or otherwise; said side members forming an annular channel H into which the rim or marginal portion of the circular inner member is held.

At suitable points in the annular side members G, I provide anti-friction bearings I each bearing consisting of a cylindrical shell J closed at one end and having a marginal flange $j$, said shells being threaded into openings K in the side members and having the flanges $j$ bearing against the outer surfaces of said side-members, the flanges being notched, as at $j^1$, for application thereto a suitable tool whereby the shells may be removed from said side members. Within each of said shells is placed a pair of anti-friction balls L in contact with each other and one in contact with the inner surface of the end wall of the shell, and the other in contact with the rim of the circular inner member E. The inner edges of the annular side members G are provided with curved notches $g$ at regular intervals and in line with the curved notches $e^4$ of the circular inner member.

In preferred form, and for cars of medium weight and size, I employ two pair of annular springs M which serve as a means of connection or retention of one member of the wheel with respect to the other; one pair of these springs being placed at each side of the wheel and the springs of each pair being connected or trussed together by a spacing-member N comprising a grooved plate $n$ having an opening $n^1$ midlength and two clamping members $n^2$ secured by means of screws $n^3$, or otherwise, to the plate $n$. These spacing members are arranged equi-distant around the wheel preferably at points centrally between the spokes of the inner circular member E and the two pair of springs are connected together by bolts O having opposite ends reduced in diameter and threaded, as at $o$, said threaded ends being passed through the openings $n^1$ in the spacing member and having nuts $o^1$ applied thereto to retain the two pair of springs in proper relative position; also to prevent displacement of one member of the wheel relative to the other.

I surround the large intermediate portion of the bolts O with three sleeves or rollers P which bear against the curved notches $e^4$ and $g$ of the inner circular member and annular side members, respectively, the intermediate roller of each bolt O bearing against the inner circular member E while the outer rollers bear against the annular side members G. When the parts of the wheel are in normal position, these rollers bear against the said curved notches at central points thereof and the inner and outer members are adapted to ride over these roller-bearing bolts in opposite directions when the wheel is subjected to torsional strain, such as occurs when starting the car in motion either forward or backward or when striking an obstruction in the road; also to a slight extent when turning corners or rounding curves.

The springs may also be made of lighter or heavier stock so as to accommodate cars of different weight, as this is fully within the skill of any mechanic constructing a wheel within the scope of my invention.

When starting the car in motion, either forward or backward, the outer member of the wheel is subjected to a slight circular motion which is imparted to the annular springs M by reason of the roller-bearing bolts which connect the opposite pair of springs bearing against the inner edges of the side members G of the wheel, and as these members are provided with curved notches against which the outer rollers of the bolts contact, the side members have a slight movement on said rollers, forcing the bolts toward the axis of the wheel and placing the annular springs under strain until the movement is imparted to the inner member which is brought about by the intermediate rollers of the bolts O bearing against the curved notches of the inner circular member of the wheel. The springs M therefore serve as flexible means of connection between the outer and inner members of the wheel and therefore, when under extra strain, such as might be imposed when striking an obstruction upon the road, there is a natural increase of resistance due to the increased circular motion of the outer wheel member which causes the curved notches to increase its contact stroke or movement against the roller bearing bolts O forcing said bolts toward the axis of the wheel a greater distance and consequently placing the annular springs under greater strain. As soon as the car is brought into motion, the parts assume their normal position, thus forcing the inner circular member back to its central springy position. The construction of the springs and their manner of attachment makes it almost impossible to break them even under extraordinary strain as they give and resist in a constantly springy manner under any condition of the road; and as the inner member is held within the outer member to yield in any direction radially, there is little or no chance of the body of the car being thrown upward, the action being similar in result to a boat cutting through the water instead of being tossed with the waves.

This invention can be used equally well on front or rear wheels, and be applied to wheels of ordinary construction by slightly modifying the rim of the wheel.

Having thus described my invention, what I claim as new is,—

1. A vehicle wheel comprising an inner member, an outer member surrounding said inner member, and a plurality of trussed annular springs at each side of the wheel, the springs at opposite sides of the wheels being connected and serving as a means for yieldingly connecting the outer member to the inner member.

2. A vehicle wheel comprising an inner member having inwardly-facing curved surfaces, an outer member surrounding said inner member and also provided with inwardly-facing curved surfaces, and an annular spring having contact parts engaging said curved surfaces and yieldingly connecting said inner and outer members.

3. A vehicle wheel comprising an inner member having a rim and spokes converging from said rim toward the center of the wheel, said rim having curved notches formed in its inner peripheral edge, an outer member surrounding said inner member and having annular side members provided on their inner peripheral edges with curved notches, the rim of said inner member lying between said annular side members, and means for yieldingly connecting said members including contact parts in contact with said curved notches.

4. A vehicle wheel comprising an inner member having a hub, a rim, and spokes converging toward the center from said rim, an outer member surrounding said inner member and provided with two annular side members between which the marginal portion of said inner member is located, an annular spring in a plane outside of each side member, and means to connect said springs and against which the inner peripheral edge of the rim of said inner member and the inner peripheral edges of said annular side members bear.

5. A vehicle wheel comprising an inner member having a hub, a rim, and spokes converging toward the center from said rim, an outer member surrounding said inner member and provided with two annular side members between which the marginal portion of said inner member is located, an annular spring in a plane outside of each side member, bolts connecting said springs and against which the inner peripheral edge of the rim of said inner member and the inner peripheral edges of said annular side members bear.

6. A vehicle wheel comprising an inner member having a hub, a rim, and spokes converging toward the center from said rim, an outer member surrounding said inner member and provided with two annular side members between which the marginal portion of said inner member is located, an annular spring in a plane outside of each side member, bolts connecting said springs, and anti-friction sleeves surrounding each bolt in contact respectively with the inner peripheral edge of the rim of said inner member and the inner peripheral edges of said annular side members.

7. A vehicle wheel comprising an inner member having a hub, a rim, and spokes converging toward the center from said rim, an outer member surrounding said inner member and provided with two annular side members between which the marginal portion of said inner member is located, an annular spring in a plane outside of each side member, bolts connecting said springs and having two end rollers and an intermediate roller surrounding it, said end rollers being in contact with the inner peripheral edges of said annular side members and said intermediate roller being in contact with the peripheral inner edge of the rim of said inner member.

8. A vehicle wheel comprising an inner member having inwardly-facing curved surfaces, an outer member surrounding said inner member and also provided with inwardly-facing curved surfaces, an annular spring at each side of the wheel, and means connecting said springs and in contact with the inwardly-facing curved surfaces of said inner and outer members.

9. A vehicle wheel comprising an inner member having inwardly-facing curved surfaces, an outer member surrounding said inner member and also provided with inwardly-facing curved surfaces, an annular spring at each side of the wheel, bolts extended from side to side of the wheel and connecting said springs, said bolts co-acting with the inwardly-facing curved surfaces of said outer and inner members.

10. A vehicle wheel comprising an inner member having inwardly-facing curved surfaces, an outer member surrounding said inner member and also provided with inwardly-facing curved surfaces, an annular spring at each side of the wheel, bolts connecting said springs, and anti-friction rollers surrounding each bolt, said rollers being in contact with the inwardly-facing curved surfaces of said outer and inner members.

11. A vehicle wheel comprising an inner member having a rim and spokes converging from said rim toward the center of the wheel, said rim having curved notches formed in its inner peripheral edge, an outer member surrounding said inner member and having annular side members provided on their inner peripheral edges with curved notches, the rim of said inner member lying between said annular side members, a plurality of spaced annular springs at each side of the wheel, bolts connecting the springs at one side of the wheel with those at the other, and two end and one intermediate anti-friction rollers surrounding each bolt and co-acting with the curved notches formed in the rim of the inner member and in the peripheral edges of said annular side members.

12. A vehicle wheel comprising an inner member having a rim and spokes converging from said rim toward the axis of the wheel, said rim having curved notches in its inner peripheral edge, an outer member surrounding said inner member and having two annular side members between which the rim of said inner member is located and the inner peripheral edges of which have curved notches normally registering with the curved notches of said rim, a pair of annular springs at each side of the wheel in planes outside of said annular side members, spacing members holding the springs of each pair in spaced relation, bolts connecting the spacing members at one side of the wheel with the spacing members at the other side thereof, and three anti-friction rollers surrounding each bolt, the end rollers being in contact with corresponding curved notches of the annular side members while the intermediate roller is in contact with the registering curved notch of the inner member.

In testimony whereof I have affixed my signature in the presence of two subscribing witnesses.

FRANK H. BEAMER.

Witnesses:
EMIL NEUHART,
ELLA C. PLUECKHAHN.

Copies of this patent may be obtained for five cents each, by addressing the "Commissioner of Patents, Washington, D. C."